Figure 6:
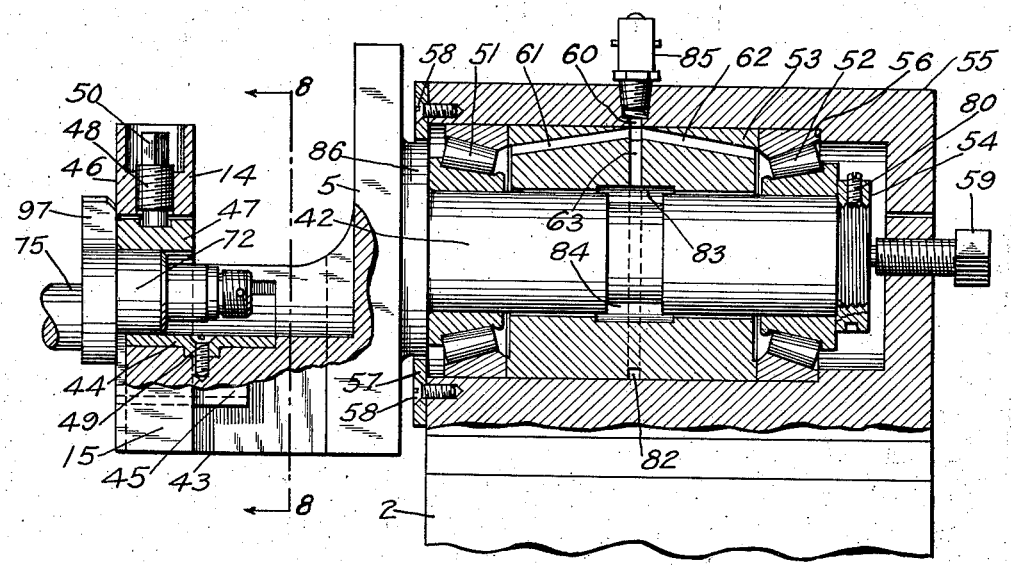

July 27, 1937. P. W. DEMPSEY 2,088,187
MECHANISM FOR MACHINING CRANKSHAFTS
Filed Nov. 12, 1935 3 Sheets-Sheet 1
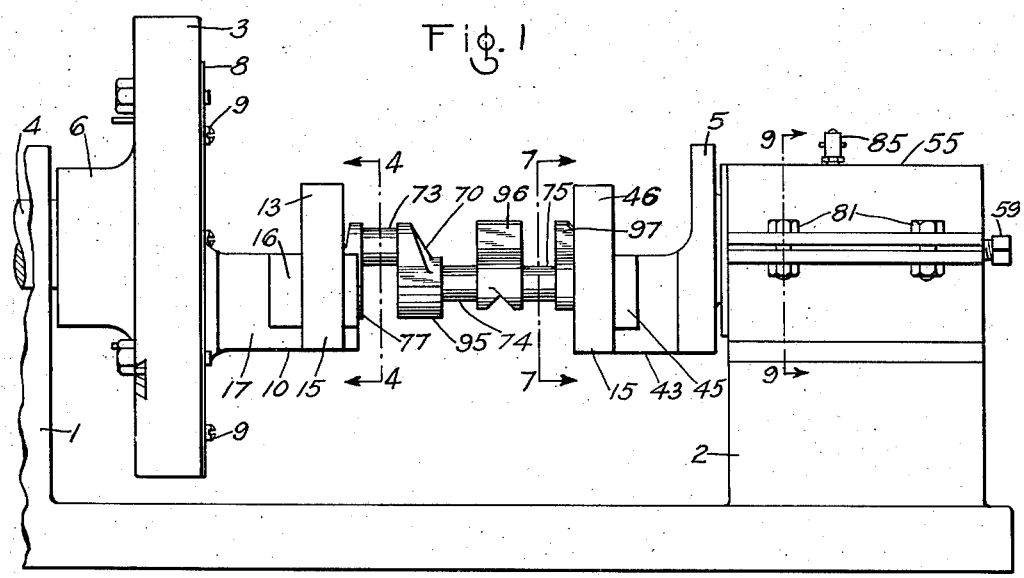
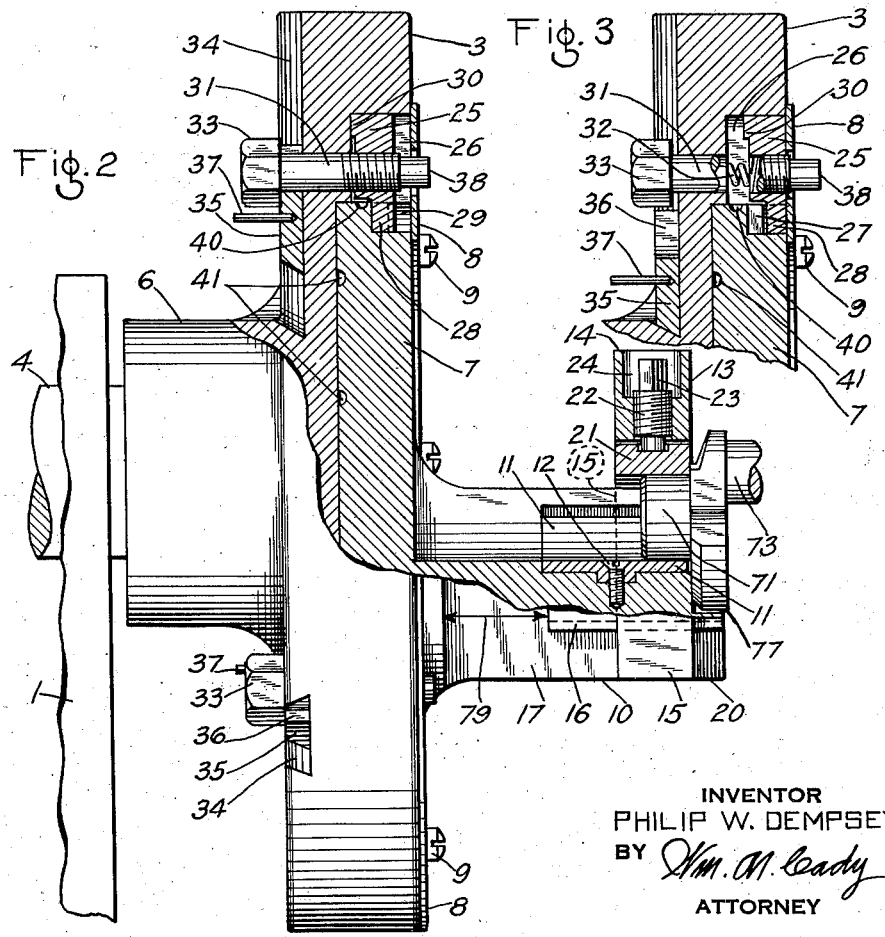
INVENTOR
PHILIP W. DEMPSEY
BY Wm. M. Cady
ATTORNEY July 27, 1937. P. W. DEMPSEY 2,088,187
MECHANISM FOR MACHINING CRANKSHAFTS
Filed Nov. 12, 1935 3 Sheets-Sheet 2
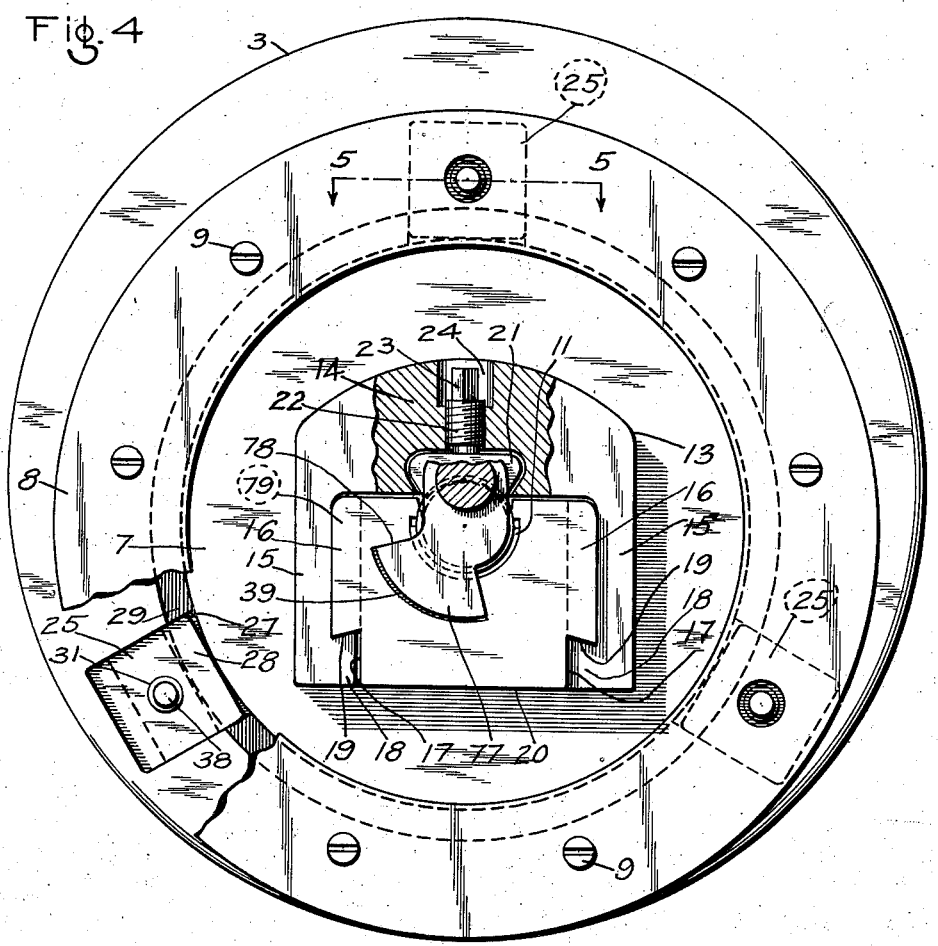
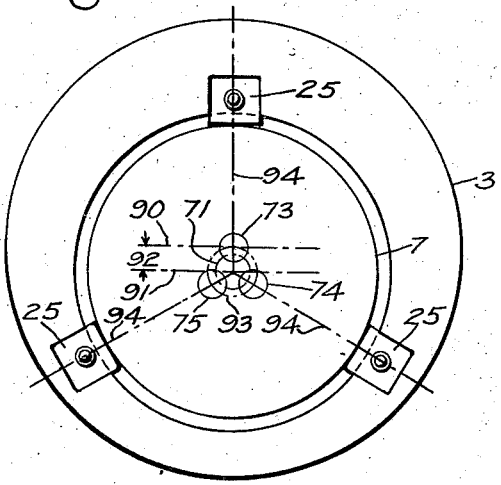
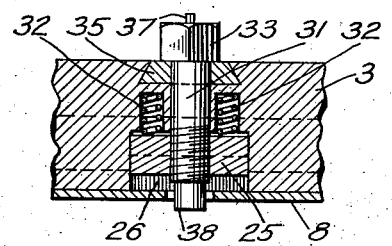
INVENTOR
PHILIP W. DEMPSEY
BY
ATTORNEY July 27, 1937.   P. W. DEMPSEY   2,088,187
MECHANISM FOR MACHINING CRANKSHAFTS
Filed Nov. 12, 1935   3 Sheets-Sheet 3

INVENTOR
PHILIP W. DEMPSEY
BY Wm. H. Cady
ATTORNEY

Patented July 27, 1937

2,088,187

UNITED STATES PATENT OFFICE 2,088,187

MECHANISM FOR MACHINING CRANK-SHAFTS

Philip W. Dempsey, Pittsburgh, Pa., assignor to The Westinghouse Air Brake Company, Wilmerding, Pa., a corporation of Pennsylvania Application November 12, 1935, Serial No. 49,336

4 Claims. (Cl. 82—40)

This invention relates to crank shafts for reciprocating engines, compressors and the like, and more particularly to means for use in the manufacture of same.

Crank shafts for multi-cylinder compressors or the like are usually provided with one or more main bearings and a plurality of connected rod bearings which are usually interposed between the main bearings and disposed peripherally around the axis of the main bearings at a distance from said axis to provide the desired throw or stroke of the pistons to be operated thereby.

In the manufacture of crank shafts, it is necessary that the portion upon which a connecting rod bearing is to be machined be disposed centrally between the turning centers of a lathe or similar machine for machining said bearing. When there are a number of connecting rod bearings arranged circumferentially around the axis of the crank shaft, it is therefore necessary that the crank shaft be reset in the lathe for machining each connecting rod bearing. Unless special equipment or tools are provided to facilitate this setting, it is laborious and difficult, and errors in the setting are very likely to occur resulting in defective crank shafts which have to be scraped, as well as the extra expense due to the excessive amount of labor required.

One object of the invention is to provide improved apparatus adapted to be applied to a lathe or the like for carrying a crank shaft upon which connecting rod bearings are to be machined and provided with means for easily, quickly and accurately adjusting the portions of the crank shaft upon which the connecting rod bearings are to be formed between the centers of the lathe so as to reduce to a minimum the possibility of error.

Another object of the invention is to provide a crank shaft machining means in which the crank shaft is adapted to be mounted in preparation to the machining of the connecting rod bearings thereon and from which it is not necessary to remove the crank shaft until all of the connecting rod bearings have been machined.

Another object of the invention is to provide improved apparatus of the above character which is adapted to be quickly and accurately adjusted by hand to set the portion of a crank shaft upon which a connecting rod bearing is to be machined in line with the turning centers of a lathe.

Another object of the invention is to provide improved apparatus of the above character having novel crank shaft driving means adapted to ensure that the connecting rod bearings will be machined on the crank shaft in the proper relation to integral counterweights provided on the crank shaft.

A specific object of the invention is to provide special appliances adapted to be carried by the head stock and tail stock of a lathe and adapted to carry a crank shaft which has a counterweight in driving engagement with the appliance on the head stock, and in which the appliance on the head stock is provided with means whereby the crank shaft may be quickly and accurately adjusted manually to position any one of a plurality of throws on the crank shaft in alignment with the centers of the lathe for machining the throw portion of a connecting rod bearing.

Other objects and advantages will be apparent from the following more detailed description of the invention.

Figure 7:
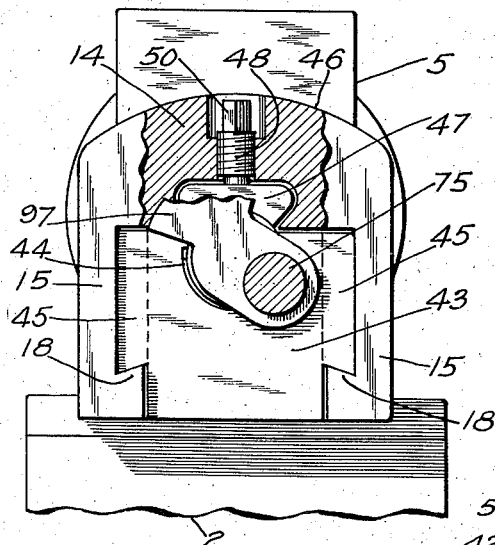
Figure 8:
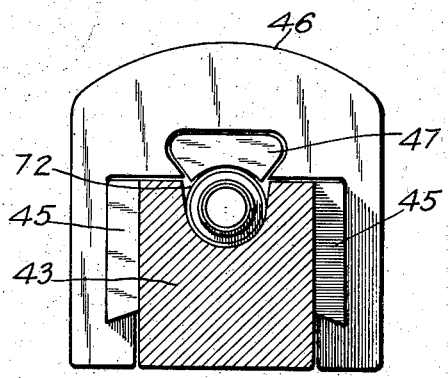
Figure 9:
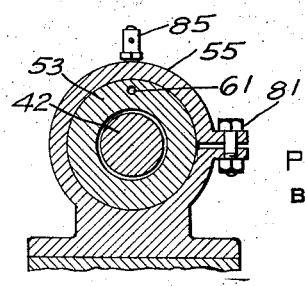

In the accompanying drawings: Fig. 1 is an assembly view of a portion of a lathe showing the improved appliances mounted thereon and carrying a crank shaft; Fig. 2 is an enlarged side elevation, partly in section, of the portion of the lathe including the head stock and driving head; Fig. 3 is a fragmentary view of the driving head shown in Fig. 2 with certain parts shown in a different position; Fig. 4 is an enlarged plan view of the driving head shown in Fig. 1 and taken on the line 4—4 in Fig. 1; Fig. 5 is a sectional view taken on the line 5—5 in Fig. 4; Fig. 6 is an enlarged side elevation, mainly in section, of the portion of the lathe including the tail stock; Fig. 7 is an enlarged plan view, partly in section, of a follower shown in Fig. 1, and taken on the line 7—7 in Fig. 1; Fig. 8 is a sectional view taken on the line 8—8 in Fig. 6; Fig. 9 is a sectional view taken on the line 9—9 in Fig. 1; and Fig. 10 is a diagrammatic view illustrating the principle whereby the several connecting rod bearings of a crank shaft may be quickly and accurately adjusted for machining without removing the crank shaft from the lathe.

As shown in the drawings, the apparatus for carrying crank shafts having connecting rod bearings to be machined is carried by the head stock 1 and tail stock 2 of a lathe or similar machine. This apparatus comprises a driving head 3 adapted to be secured to the driving shaft 4 in the head stock 1 and a follower 5 mounted to rotate in the tail stock 2.

The driving head 3 comprises a round disk having on one side a centrally arranged boss 6 for attachment to the lathe shaft 4 and having in the opposite face a cylindrical recess arranged eccentric to the periphery of the head 3. The center of this recess is offset from the center of the head 3 a distance equal to the distance between the axes of the main bearing and connecting rod bearing, of the crank shaft to be machined, or in other words, a distance equal to one half the reciprocative movement or throw of the connecting rod bearings.

A centering plate 7 is disposed in this recess in the driving head 3. This plate has a neat fit in the recess so as to prevent side play in the driving head but is adapted to be freely rotatable by hand relative to the driving head. The centering plate 7 has a thickness which is equal to the depth of the recess in the driving head and is held in place in the driving head by means of a ring shaped plate 8 of sheet metal which is secured to the driving head by a plurality of screws 9 and which extends over the edge of the centering plate a short distance.

A substantially rectangular shaped lug 10 projects from the outer face of the centering plate 7 and is provided in one side with an axial groove which is lined for a portion of its length with a wearing plate 11 secured to said lug by a screw 12. The inner surface of this wearing plate is semicircular in form and concentric with the periphery of the centering plate 7, and the radius of this semicircular surface is substantially the same as that of the main bearings on the crank shaft to be machined, so as to closely fit around a portion of one of said bearings.

A U shaped bearing clamp 13 is adapted to be carried by the lug 10 for clamping the main bearing of a crank shaft against the wearing plate 11. This clamp comprises a head 14 adapted to be disposed over the wearing plate 11, and two oppositely disposed legs 15 carried by the head 14. The inside surfaces of these legs are substantially parallel and slidably engage the parallel sides of two pad-like extensions 16 which are provided on the two opposite sides 17 of the lug 10, which sides are adjacent to the side of the lug 10 carrying the wearing plate 11.

An inwardly directed lug 18 is provided on the end of each of the legs 15 and is adapted to engage a shoulder 19 provided on one side of each of the pads 16. These shoulders are preferably set back from the face 20 of the lug 10 a distance such that when the lugs 18 engage said shoulders the ends of the legs 15 will not extend beyond the face 20 of the lug 10 to catch on the operator's clothing or the like. The lugs 18 are preferably hook shaped and the shoulders are similarly shaped so as to prevent spreading of the clamp legs 15 when the clamp is stressed, as will be hereinafter described.

The pads 16 extend from the end of lug 10 inwardly to a space 19 which is provided between the end of each lug and the outer face of the centering plate 7. The spaces 19 are of greater width than the width of the clamp legs 15, so that the clamp legs may be moved into these spaces to disengage the lugs 18 from the pads 16 and thereby permit removal of the clamp from the lug 10.

A recess is provided in the clamp head 14 which extends laterally through the head and opens into the space between the legs 15. The sides of this recess are undercut and mounted in the recess is a clamping block 21 which loosely follows the shape of the recess, as shown in Fig. 4, the block 21 being of substantially the same length as the thickness of the clamp head.

The inner circular surface of this block 21 is formed at a radius substantially equal to or slightly greater than that of the main bearing of the crank shaft to be machined. A recess is provided in the opposite side of the block to receive the end of a set screw 22 which is carried by and has screw threaded engagement in the head 14 of the clamp 13. The head 23 of this set screw is disposed in a counterbore 24 provided in the outer surface of the clamp head 14 and therefore requires a socket wrench for turning.

The undercut sides of the recess and corresponding shape of the block 21 act to prevent said block from falling into the space between the legs 15, while the end of screw 22 which extends into the recess in the block prevents said block from sliding lengthwise out of the recess in the clamp head 14, when said clamp is not in use.

The centering plate 7 is adapted to be freely turned by hand in the recess which contains it in the driving head 3 for the purpose of centralizing between the centers of the lathe the portions of a crank shaft upon which connecting rod bearings are to be machined, and then the centering plate 7 is adapted to be locked to the driving head 3, so as to be turned thereby, by a plurality of driving blocks 25 which are spaced equidistant around the periphery of the centering plate 7.

Each of the blocks 25 is slidably mounted in a recess 26 in the driving head 3, which recess opens to the inner peripheral wall of the recess which contains the centering plate 7. The centering plate 7 is provided with spaced recesses 27 each of which is adapted to receive a tongue 28 which projects radially inwardly from the block 25. The centering plate also has an annular recess 29 which opens to the periphery and outer face of said plate, the depth of said recess, measured from the outer face of the centering plate, being slightly greater than the thickness of the tongue 28 on block 25 so that with the block 25 engaging the ring shaped plate 8 the tongue 28 will be disengaged from the centering plate 7 as is shown in Fig. 3 of the drawings. The outer end of the block 25 is provided on the inner surface with a raised portion or heel 30 adapted to engage the end wall of recess 26 at substantially the same time as the tongue 28 engages the bottom of recess 27.

A bolt 31 is provided for pulling each block 25 into its respective recesses 26 and 27 in the driving head 3 and centering plate 7, while at each side of said bolt a spring 32 is interposed between said head and block for moving said block out of driving engagement with said plate, that is, to the position shown in Fig. 3 of the drawings.

Each of the bolts 31 has screw-threaded engagement with its respective block 25 and slidably extends through a suitable bore in the driving head 3 and through an undercut groove 34 provided radially in the rear face of said driving head, each of the slots 34 being of such width as to freely receive a head 33 provided on the end of the respective bolt.

A shim 35 is slidably mounted in each of the grooves 34 between the bolt 31, which extends into the respective groove, and the axis of the driving head 3. A slot 36 is provided in the outer end of each of the shims 35 adapted to freely receive and thus fit around the respective bolt 31 beneath the head 32. A pin 37 is secured to each of the shims 35 for manually moving same as will hereinafter be described.

Each of the bolts 31 is provided on the end opposite that provided with the head 33 with an extended portion of reduced diameter or pin 38 which freely extends through an opening in plate 8.

A recess 39 is provided in the end of the lug 10 adapted to receive a counterweight on the end of the crank shaft to be machined, for turning said crank shaft, as will be hereinafter described.

An annular groove 40 is provided in the peripheral face of the centering plate 7 and a plurality of annular grooves 41 are provided in the inner face of said plate, these grooves being adapted to be packed with a particularly low friction grease to facilitate free turning of the centering plate 7 in the recess in the driving head 3, and also to fill clearance space between said plate and head to prevent entrance of foreign matter such as metal chips and cutting lubricant.

The follower 5 comprises a plate carried by a shaft 42 and having on the face opposite the shaft an outwardly projecting lug 43 which is of substantially the same construction as the lug 10 which is carried by the centering plate 7. This lug is provided with an axial groove in one face in which there is secured by a screw 49 a semi-circular wearing plate 44 adapted to receive an end main bearing of a crank shaft. The lug is also provided with side pads 45 corresponding to pads 16 on the lug 10, and a clamp 46, which is identical in construction to the clamp 13 carried by lug 10, is provided on the lug 43, this clamp carrying a clamping block 47 and set screw 48 having a head 50 for turning the set screw by means of a wrench.

The shaft 42 which carries the follower 5 is mounted between antifriction roller bearing assemblies 51 and 52 which are spaced on said shaft by a spacer element 53, which is provided with an axial bore through which the shaft 42 freely extends. A nut 54 is provided on the end of shaft 42 for adjusting the bearings 51 and 52 on the shaft 42, while a set screw 80 is provided in said nut and is adapted to be screwed against the screw threads on the end of shaft 42 for locking the nut 54 and thereby the bearings in an adjusted condition. The bearings 51 and 52 and spacer 53 are thus assembled and adjusted on the shaft 42 outside of the housing 55. This assemblage is pushed into the housing by hand until the bearing 52 engages a shoulder 56 formed therein.

The housing 55 is split lengthwise along one side, as shown in Fig. 10, the two edges of the housing adjacent the split being provided with flanges through which there is provided one or more bolts 81. After the assemblage above described is in place in the housing, the bolts 81 are tightened which securely clamps the housing to the spacer 53 and bearings 51 and 52.

A ring shaped guard 57 is assembled on the shaft 42 ahead of the bearing 51, and after the assemblage is secured in the casing, the guard 57 is secured over the open end thereof by a plurality of screws 58 which have screw-threaded engagement with the casing. This guard is provided to keep foreign matter out of the bearing 51.

A screw 59 is provided through the rear end wall of the housing 55 in axial alignment with the end of the shaft 42. This screw may be turned to apply pressure to the end of shaft 42 and thereby the bearings 51 and 52 and spacer 53 for effecting removal thereof from the casing 55, if such becomes necessary.

A lubricating passage 60 is provided through the top wall of the casing 55 and registers at its inner end with an annular groove 82 provided around the exterior surface of the spacer 53. In the spacer there are provided passages 61 and 62 which connect to the annular groove 82 and lead to the roller bearings 51 and 52 respectively. The spacer is also provided with a passage 63 which connects to the annular groove 82 and leads to an annular groove 83 formed in the inner peripheral wall of said spacer, the groove 83 registering with an annular groove 84 provided in the shaft 42.

A lubricating fitting 85 of any suitable type is secured to the casing and is open to passage 60. A suitable grease gun (not shown), filled with a special low resistance grease, is adapted to be connected to said fitting and operated to force grease through passage 61 to the annular groove 82 and from thence through passages 61 and 62 to the bearings 51 and 52, and also through passage 63 to the annular grooves 83 and 84 and from thence through the clearance space between the spacer 53 and shaft 42. Grease is thus forced into the housing 55 until it commences to be forced out through the clearance space between the inner periphery of the plate 57 and the periphery of a boss 86 which is provided on the rear face of the follower 5. The oppositely disposed coacting annular grooves 83 and 84 in the spacer 53 and shaft 42, respectively, form a grease reservoir adapted over a period of operation to maintain the bearings 51 and 52 adequately lubricated and also provides a supply of grease which gradually works out through the space between the plate 57 and boss 86 so as to maintain this space filled with lubricant and thereby prevent foreign matter, such as metal chips and the like, and cutting fluid used in machining operations, from gaining access to the bearings 51 and 52.

From the above description of apparatus, and more particularly by reference to Fig. 4 of the drawings, it will be noted that the centering plate 7 may be turned to three different positions in the driving head 3 and then locked in these positions, which are spaced 120° apart, by the blocks 25. This centering plate and head are therefore particularly adapted for use in connection with machining crank shafts having three connecting rod bearings spaced 120° apart.

In Fig. 1 of the drawings is shown a crank shaft 70 which is provided with main bearings 71 and 72 at the two ends, as shown in Figs. 2 and 6 of the drawings, and with three intermediate connecting rod bearings 73, 74 and 75 spaced 120° apart. The crank shaft is also provided with counterweights 77, 95, 96 and 97.

In preparing the crank shaft 70 to have the connecting rod bearings 73, 74 and 75 machined thereon, the main bearings 71 and 72 are first machined, and also one face of one of the end counterweights is lightly machined or faced for engaging one end wall of the recess 39 in the lug 10 to properly position the crank shaft with respect to the positions of the centering plate 7, whereby the connecting rod bearings will be machined in the proper relation to said counterweight and consequently the other counterweights.

In the drawings, the face 78 of the counterweight 77 is machined as just described and is adapted to fit into and engage one side wall of the recess 39 in the lug 10.

In operation, the driving head 3 and follower 5 are preferably initially positioned with the lugs 10 and 43 in their lowermost position to facilitate mounting the crank shaft therein. The clamps 13 and 46 are shifted to the rear of the lugs 10 and 43, respectively, and then a crank shaft 70 is mounted in the lugs, first inserting the counterweight 77 in the recess 39 and then resting the main bearing 71 upon the wearing plate 11 and the opposite main bearing 72 on the wearing plate 44. The machined face 78 on the counterweight 77 is then turned into engagement with the adjacent end wall of recess 39.

The clamp 13 is then slid into place over the main bearing 71 and then the screw 22 is turned and forces the clamping block 21 against the main bearing 71 and securely clamps said bearing against the wearing plate 11. Since the main bearing 72 at the opposite end of the crank shaft merely rests in and is not at this time clamped to the tail lug 43, and since the follower 5 is freely rotatable in its bearings 51 and 52, the bearing 72 is permitted to shift as the bearing 71 is clamped, so that the clamping of bearing 71 to lug 10 automatically centralizes the crank shaft 70 with respect to the centers of the lathe.

With the crank shaft 70 mounted in the lathe as above described, the axis of the main bearings 71 and 72 of the crank shaft coincide with the axis of the centering plate 7, so that the portions of the crank shaft upon which the connecting rod bearings are to be machined are properly located with respect to the main bearings, while the disposition of the counterweight 77 adjacent the main bearing 71 locates said portions of the crank shafts so that said connecting rod bearings will be formed in the proper location with respect to said counterweights.

It is desired to first machine the connecting rod bearing 75 which is farthest from the driving head 3, then next the bearing 74 and finally the bearing 73, so that while machining the bearing 75 the material to be later machined off of the crank shaft to form the bearings 73 and 74 will aid in resisting distortion of the crank shaft during the machining operation, while when machining the bearing 74 the material to be later removed in forming bearing 73 will aid in resisting distortion of the crank shaft, as will be evident.

If the centering plate 7 is positioned in the driving head 3 as shown in Figs. 2 and 4, then when the crank shaft 70 is mounted in and secured to the lug 10 as above described, the portion of the crank shaft upon which the connecting rod bearing 73 is to be formed is automatically positioned between the centers of the lathe for machining. It is then necessary to turn the centering plate 7 relative to the driving head 3 through an arc of 120° in a counterclockwise direction, as viewed in Fig. 4 of the drawings, in order to bring the portion of the crank shaft upon which the connecting rod bearing 75 is to be machined between the lathe centers.

In order to thus turn the centering plate 7 relative to the driving head 3, a wrench is applied to the heads 33 of the bolts 31 and said bolts are unscrewed from the driving blocks 25 about one half turn which releases the pressure of the bolt heads 33 on their respective shims 35. Hand pressure is then applied to pins 37 which moves the shims inwardly to their innermost position in which they clear the respective bolt heads 33. When the shims 35 are thus removed from beneath the bolt heads 33, the pressure of springs 32 on the driving blocks 25 promptly shifts said driving blocks outwardly into engagement with the plate 8, in which position the tongue 28 on each of said blocks is clear of its respective recess in the centering plate 7, and the head 33 of each of the bolts 31 is disposed within its respective groove 34. It will be understood that this releasing of the driving blocks 25 from the centering plate 7 is accomplished by the releasing of one bolt 31 at a time and then operating its respective shim 35.

With all of the blocks 25 thus moved to their outer position against the plate 8, the centering plate 7 is then free to be turned by hand relative to the driving head 3, and is thus turned through 120° or until the recesses 27 therein register with the next adjacent block 25. This registration is quickly and accurately ascertained by applying hand pressure to the extension 38 of one of the bolts 31 while turning the centering plate 7, since when the recess 27 registers with the tongue 28 on the block 25 which is subject to hand pressure from a bolt 31, the block 25 will drop into place, whereupon, the shim 35 is slipped beneath the head 33 of said bolt. Manual pressure is then released from this bolt extension, and the pressure of springs 32 acts to pull the bolt head 33 against the shim 35 which holds the shim in place beneath the bolt head and also holds the tongue 28 on the block in the recess 27 in the centering plate 7. After one block 25 is thus operated, then the others are merely pressed into position and the shims 35 moved under their respective bolt heads. All of the bolts 31 are then tightened against the shims 35 and act to pull the blocks 25 to their inner position thereby locking the centering plate 7 to the driving head with the portion of the crank shaft upon which the connecting rod bearing 75 is to be formed disposed between the lathe centers.

The main bearing 72 is not clamped to the lug 43 while effecting relative movement between the centering plate 7 and driving head 3 as above described, which permits this end of the crank shaft to turn relative to the tail lug 43. However, after the crank shaft has been adjusted to bring the portion, upon which it is desired to machine a connecting rod bearing, in axial alignment with the lathe centers, then the clamp 46 is positioned over the main bearing 72 and the screw 48 operated to press the clamping block 47 against said bearing thereby securely anchoring this end of the crank shaft to the tail lug 43.

After the crank shaft is positioned as above described and locked in this position, then the portion of the crank shaft upon which the bearing 75 is to be provided is turned or machined in the usual manner to provide said bearing.

After the bearing 75 is formed, then the tail clamp 46 is released and the driving blocks 25 operated in the manner hereinbefore described to release the centering plate 7 from the driving head 3. The centering plate 7 is then turned again in a counterclockwise direction relative to the driving head 3, as viewed in Fig. 4 of the drawings, through an arc of 120° or until the recesses 27 line up with the tongue 28 on the next driving block 25. The blocks 25 are then again pulled into their driving position and the tail clamp 46 tightened. The connecting rod bearing 74 is then machined. This operation is then repeated for machining the connecting rod bearing 73 after the connecting rod bearing 74 is machined.

After all of the connecting rod bearings 73, 74 and 75 are machined, then the clamps 13 and 46 are released from and slipped back off of the main bearings 71 and 72 respectively. The crank shaft is then removed, another placed in the machine and the above described operation repeated.

Fig. 10 shows in somewhat diagrammatic form the principle involved in obtaining the proper centering of the different connecting rod bearings 73, 74 and 75 between the centers of a lathe merely by turning the centering plate 7 relative to the driving head 3.

The reference characters employed in Fig. 10 correspond to those used in the above description of the actual structure. In this figure the line 90 passes through the center of the driving head 3 and therefore of the lathe, while the parallel line 91 passes through the center of the centering plate 7. The reference character 92 represents the vertical distance between the lines 90 and 91, and this distance is the degree of eccentricity of the centering plate 7 with respect to the driving head 3 and also corresponds to the degree of eccentricity or one half of the throw of the connecting rod bearings on the crank shaft to be machined.

A line diagram of the crank shaft main bearing 71 and connecting rod bearings 73, 74 and 75 is superimposed on the centering plate 7 with the axis of the main bearing 71 coinciding with that of the driving plate 7, and it will be noted that the dot and dash circle 93 which passes through the axes of said connecting rod bearings also passes through the axis of the driving head 3 or in other words, the lathe center. Thus by turning the centering plate 7 relative to the driving head 3 and consequently turning the crank shaft about its main axis, the axes of the connecting rod bearings pass through the lathe center one at a time.

The connecting rod bearings in the illustration are three in number and spaced 120° apart, while the clamping blocks 25 correspond in number and spacing as will be clear from Fig. 10 where the same dot and dash lines 94 drawn radially from the axis of the main bearing of the crank shaft and extending through the axes of the several connecting rod bearings also extend through the center of the driving blocks 25. Thus by the mere act of shifting the centering plate 7 relative to the driving head a distance equal to the space between the driving blocks 25, the crank shaft is readily and accurately positioned for machining of the various connecting rod bearings.

It will be evident that the apparatus embodying the invention is not limited in use to a crank shaft having only three connecting rod bearings or in which the connecting rod bearings are equally spaced peripherally around the main bearings.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A device for holding and positioning a shaft to permit machining comprising a driving head, a member eccentrically mounted in said head, means for securing said shaft to said member, said member having a recess, said head having a recess adapted to aline with the recess in said member, a block movable into said recesses for effecting driving engagement between said head and member, a bolt having screw threaded engagement with said block and having a head, a movable shim adapted to fit under said bolt head, said bolt being operative upon turning against said shim to move said block into said recesses, said shim being movable out from beneath said head upon loosening said bolt from said block, and spring means for moving said block out of said recesses upon moving said shim out from beneath said head.

2. A device for holding and positioning a shaft to permit machining comprising a driving head having in one face an eccentrically disposed cylindrical recess, a cylindrical member mounted in said recess, a ring shaped plate secured to said head and extending over the periphery of said member, said member having a recess opening at the outer and peripheral faces thereof, said head having a recess beneath said plate and adapted to aline with the recess in said member, a movable block disposed in the recess in said head and movable into engagement with said plate, a tongue on said block adapted to be moved into the recess in said member and adapted when said block engages said plate to be out of the recess in said member, a bolt carried by said head and having screw threaded engagement with said block, said bolt having a head, a shim slidably mounted in said driving head and adapted to be moved between said driving head and bolt head, said bolt being operative upon turning against said shim to move said block into said recesses, said shim being movable out from beneath said bolt head upon loosening said bolt in said block, spring means for moving said block against said plate upon moving said shim from beneath said bolt head, and means operable manually to move said block into said recesses.

3. Mechanism for holding a shaft to be machined comprising a rotatable element in which a portion of the shaft is disposed, a clamping member straddling said element and having inwardly directed hook shaped lugs, lugs on said element having an undercut edge adapted to be engaged by said hook shaped lugs, and means associated with said member adapted to draw the lugs on said member into engagement with the lugs on said element and clamp said shaft to said head.

4. A shaft bearing comprising a split housing having a bore open at one end, a rotatable shaft having at one end a shoulder, an antifriction bearing assembly disposed on said shaft against said shoulder, a spacer element of no greater diameter than said bearing assembly loosely fitted over said shaft with one end in engagement with said assembly, an antifriction bearing assembly fitted on said shaft and engaging the opposite end of said element, means secured to said shaft for pressing together said spacer element and bearing assemblies for adjusting the bearings in said assemblies, said shaft, bearing assemblies and spacer element having a free sliding fit in said bore in said housing after adjusting the bearings in said assemblies, and means for clamping said housing against said bearing assemblies.

PHILIP W. DEMPSEY.